June 2, 1970   R. L. RICHARDSON ET AL   3,515,362

PARACHUTE COLLAPSING MECHANISM

Filed Nov. 14, 1968   3 Sheets-Sheet 1

INVENTORS
RAYMOND L. RICHARDSON
JOHN E. WILDRIDGE

BY   H. H. Loscle
     Paul S. Collignon

ATTORNEYS

United States Patent Office 3,515,362
Patented June 2, 1970

3,515,362
PARACHUTE COLLAPSING MECHANISM
Raymond L. Richardson, Bloomfield, and John E. Wildridge, Washington, Ind., assignors to the United States of America as represented by the Secretary of the Navy
Filed Nov. 14, 1968, Ser. No. 775,836
Int. Cl. B64d 17/38
U.S. Cl. 244—142         3 Claims

ABSTRACT OF THE DISCLOSURE

A device for collapsing a parachute which is retarding the descent of an aircraft parachute flare, said device having first and second suspension cables which are attached to a suspension plate attached to a container of illuminating composition. The first suspension cable connects one-half the parachute shroud lines directly to the suspension plate and the second suspension cable connects the other half of the parachute shroud lines to the suspension plate through an explosive bolt which is detonated by heat from the burning of the illuminating composition. Upon detonation of the explosive bolt, one-half the parachute shroud lines are separated from the suspension plate which results in collapse of the parachute.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a device for collapsing a parachute upon the completion of the burning of an illuminating composition so that the parachute will not become a hazard to air traffic. Heretofore, aircraft parachute flares which are employed by the military departments for night illumination purposes have been permitted to float to the ground after parachute opening and after the illuminating composition has been consumed. As the illuminating candle burns out, the weight suspended by the parachute is very low and the parachute tends to remain in the air a relatively long period of time, particularly when strong updrafts or thermals are present. These drifting parachutes constitute a flight hazard to other low flying aircraft, and particularly to jet aircraft that could draw a parachute into an engine.

Various devices have been employed to separate a parachute from load by severing a part of the shroud lines. For example, in U.S. Pat. 3,023,498, entitled, "Parachute Harness Strap Cutter," which issued Mar. 6, 1962, to Robert Temple et al., there is shown a device for use in cutting parachute harness straps in emergency situations. In this patented device, a cutting blade is attached to a piston which can be driven by an explosive force applied when a spring-actuated firing pin detonates a cartridge. The cutting blade is used to sever a parachute harness strap so that a parachute can be separated from a parachutist after landing. The device is initiated by manual means which are operated by the parachutists.

Another explosive cutter for parachute lines is shown in U.S. Pat. 2,897,799, which issued Aug. 4, 1959, to Joe A. Stupian. This device is used for releasing a main parachute after a desired period of free fall by severing a reefing line. A knife blade is provided for cutting the reefing line and the knife blade is actuated by an explosive force. The device is actuated by a pilot chute which discharges a striking pin against a primer which initiates the burning of a delay train which, in turn, ignites a black powder explosive propellant.

Another parachute releasing means is shown in U.S. Pat. 2,715,872, which issued Aug. 23, 1955, to Harold W. Klas. This releasing means was adapted for use with aircraft planted marine mines so that after the mine was in the water, the parachute became separated from the mine. The parachute shroud lines are connected to a releasable support having a downwardly projecting member adapted to be engaged and releasably locked by a pin. The pin is forcibly ejected from locking engagement with the support by the explosion of an electro-responsive detonating device which is adapted to be fired by electrical power received from a sea cell which is activated by sea water.

SUMMARY OF THE INVENTION

The present invention relates to a device for collapsing a parachute during descent by disconnecting one-half of the parachute shroud line from an attached load, such as an illuminating candle. One-half of the shroud lines are connected directly to a suspension plate which is attached to the candle container and the other half of the shroud lines are attached through an explosive bolt to the suspension plate. A detonator is provided within a chamber in the explosive bolt and upon detonation, the explosive bolt is severed and becomes unattached from the suspension plate.

The illuminating candle is ignited at the end opposite to which the suspension plate is attached, and the unburned composition serves as a heat insulator for the detonator. Upon consumption of most of the illuminating composition, however, heat from the burning of the composition causes a lead azide end of the detonator to ignite and the lead azide, in turn, explodes a tetryl pellet and causes the explosive bolt body to separate.

It is therefore a general object of the present invention to provide an aircraft parachute collapsing device which does not have any moving parts which might cause a malfunction.

Other objects and advantages of the present invention will be readily appreciated as the same becomes better understood by reference to the following detailed description when considered in connection with the accompanying drawings.

DESCRIPTION OF THE PREFERRED EMBODIMENT

Figure 1:
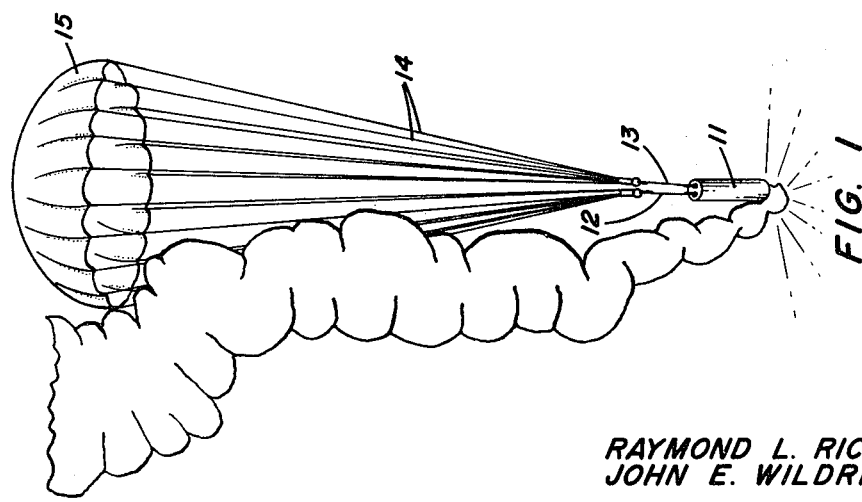
FIG. 1 is a diagrammatic view showing an illuminating device in descent while suspended to a parachute by shroud lines.

Referring first to FIG. 1 of the drawings, there is shown an illuminating flare container 11 that has a pair of suspension cables 12 and 13 attached to one end. One-half of the shroud lines 14 of parachute 15 are attached to cable 12 and the other half of shroud lines 14 are attached to cable 13.

Figure 3:
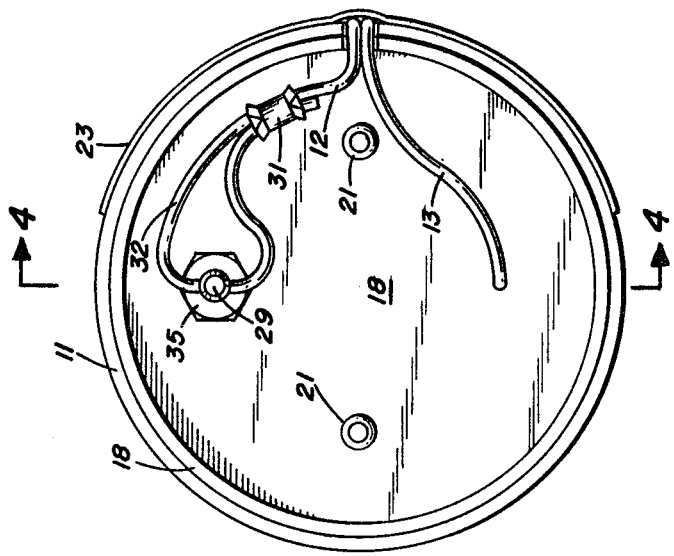
FIG. 3 is an end view of an illuminating candle showing a preferred embodiment of the present invention.
Figure 4:
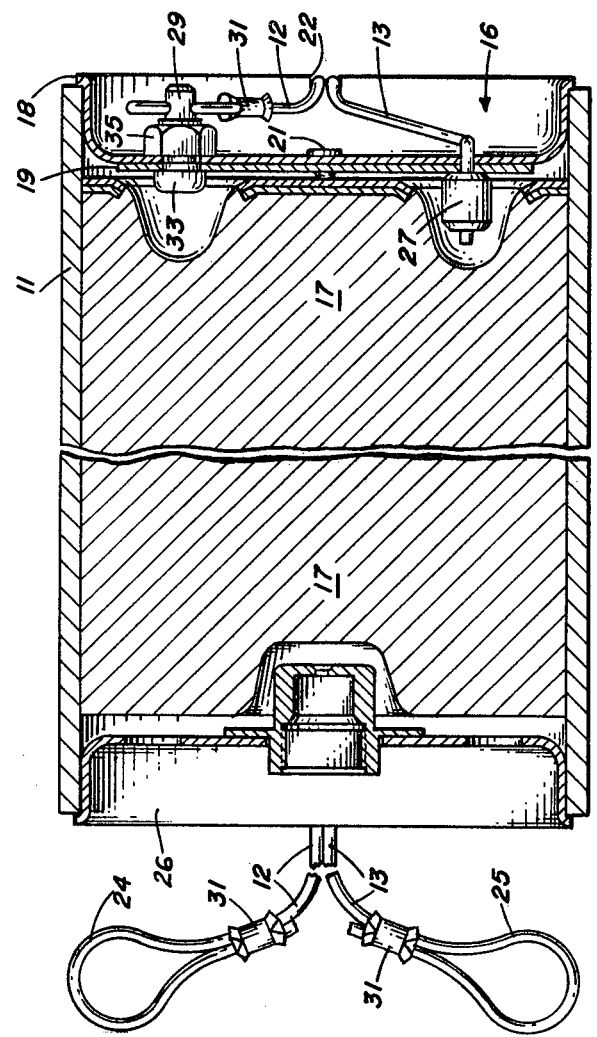
FIG. 4 is a sectional view taken on line 4—4 of FIG. 3.
Figure 5:
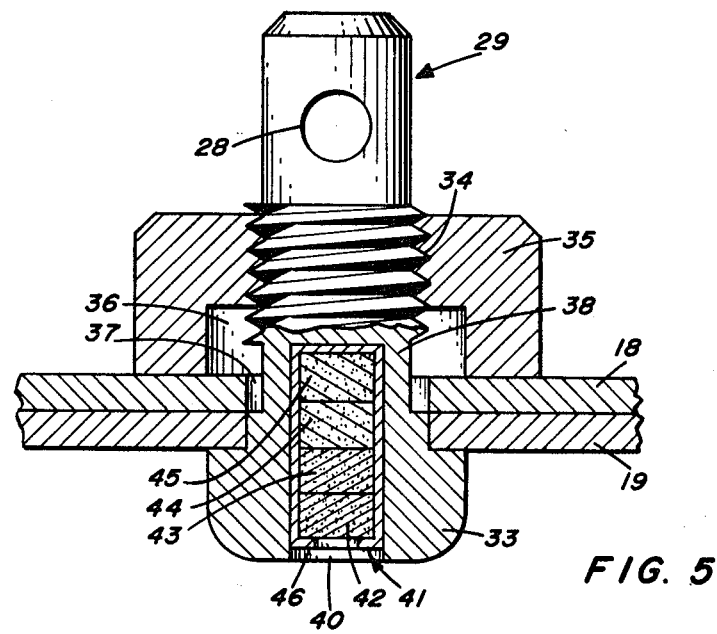
FIG. 5 is a sectional view showing an explosive bolt.

As best seen in FIGS. 3, 4, and 5 of the drawings, a suspension plate 16 is attached to one end of container 11 and a quantity of illuminating composition 17 is contained within container 11. By way of example, illuminating composition 17 might be comprised, by weight, of about 58 percent of granulated magnesium, about 37.5 percent of sodium nitrate, and about 4.5 percent of a resin binder. Suspension plate 16 is cup-shaped with the outside diameter of cup 18 being of a dimension such that cup 18 will slip fit the inside diameter of container 11. Cup 18 is attached to container 11 by any conventional manner, such as rivets, screws, welding, or the like. A reinforcing plate 19 is attached, as by rivets 21, to the bottom of cup 18 to provide additional strength. FIGS. 3 and 4 of the drawings show the position of suspension cables 12 and 13 prior to parachute opening. Cables 12 and 13 are passed through notch 22 in cup 18 and are brought around to the other end of container 11 for attaching to a parachute. Strips of tape 23 are provided to hold cables 12 and 13 to the side of container 11, and cables 12 and 13 are terminated in loops 24 and 25, respectively, to facilitate fastening to parachute shroud lines. As best shown in FIG. 4 of the drawings, a second cup 26 is attached to container 11 to hold ignition means (not shown) for igniting illuminating composition 17. The ignition means and manner of igniting illuminating composition 17 are more fully described in applicants' copending patent application entitled, "Ignition Device For Aircraft Parachute Flare," Ser. No. 775,878, filed Nov. 14, 1968.

One end of suspension cable 13 is passed through holes in the bottom of cup 18 and reinforcing plate 19, and a hub 27 is secured to the end of cable 13 to prevent the end of cable 13 to pass back through the holes. One end of cable 12 is passed through hole 28 in explosive bolt 29, and clamp 31 is attached to provide a loop 32 in the end of cable 12. Explosive bolt 29 is provided with a head 33 and a threaded portion 34. Clearance holes are provided in cup 18 and plate 19 and explosive bolt 29 is passed therethrough and secured by nut 35. As best shown in FIG. 5 of the drawings, nut 35 is provided with a counterbore 36 and also clearance hole 37 in cup 18 is larger than the undercut portion 38 of bolt 29 thereby facilitating rupture of bolt 29, as the undercut portion 38 is free to expand. The head 33 of bolt 29 is provided with a bore 40 and a heat sensitive detonator 41 is inserted therein and secured, as by staking. By way of example, heat sensitive detonator 41 might be Detonator Mark 59, which is fully described in military specification MIL-D-18665. Detonator Mark 59 is comprised of lead azide elements 42 and 43 and tetryl (trinitrophenylmethylnitramine) elements 44 and 45, which are housed in container 46.

Figure 2:
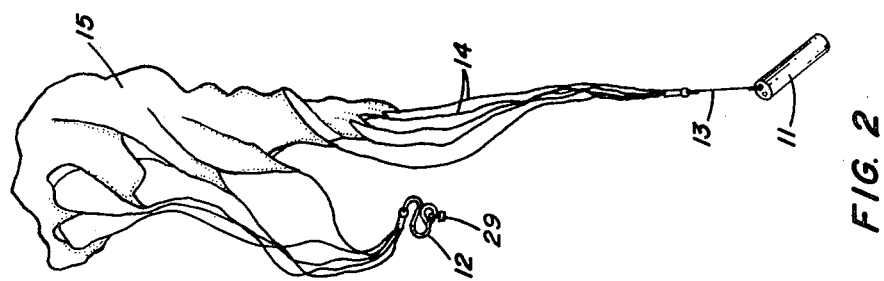
FIG. 2 is a diagrammatic view showing the parachute of FIG. 1 in a collapsed condition.
Figure 6:
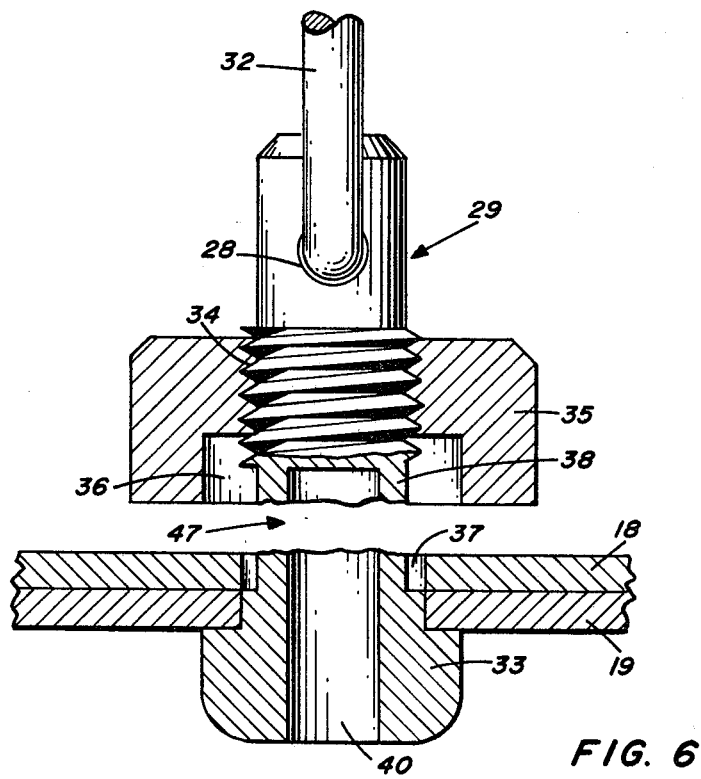
FIG. 6 is a sectional view showing an explosive bolt in a severed position.

FIG. 6 of the drawings show a fracture 47 which typically occurs upon the detonation of detonator 41. Normally the fracture will occur at the undercut portion 38 of explosive bolt 29. As shown in FIG. 2 of the drawings, upon severing of explosive bolt 29, suspension cable 12 becomes unattached from flare container 11 and causes a collapse of parachute 15, whereupon container 11 and the collapsed parachute make a rapid descent to the ground.

OPERATION

As shown in FIGS. 1 and 4 of the drawings, upon parachute opening and ignition of illuminating composition 17, the burning takes place from the bottom of container 11. When most of the illuminating composition 17 has been consumed, the heat from the burning of composition 17 causes the lead azide elements 42 and 43 to ignite which, in turn, causes tetryl elements 44 and 45 to explode and fracture and separate bolt 29. As one-half of shroud lines 14 of parachute 15 are connected through suspension cable 12 and bolt 29 to container 11, the breaking of bolt 29 causes one-half of shroud lines 14 to be disconnected from container 11 and parachute 15 collapses. Upon collapse of parachute 15, container 11, along with trailing parachute 15 makes a very rapid descent to the ground.

It can thus be seen that the present invention provides a relatively simple and inexpensive device for causing collapse of a parachute attached to an illuminating flare, after the flare has consumed the major portion of its illuminating composition. It should be understood, of course, that the foregoing disclosure relates to only a preferred embodiment of the invention and that numerous modifications or alterations may be made therein without departing from the spirit and scope of the invention.

We claim:
1. A device for collapsing during descent a parachute having a plurality of shroud lines attached to an illuminating flare container comprising,
  a suspension plate attached to and closing one end of a container having illuminating flare composition therein,
  an explosive bolt attached to said suspension plate and having a head extending on one side of said suspension plate into said container and having a threaded portion extending outwardly from the other side of said suspension plate,
  heat sensitive detonating means positioned in a bore in said head of said explosive bolt, and
  first and second suspension cables, said first suspension cable being attached between a first one-half of said shroud lines of said parachute and said suspension plate and said second suspension cable being attached between a second one-half of said shroud lines and said threaded portion of said explosive bolt whereby detonation of said heat sensitive detonator by the heat produced by burning said illuminating flare composition severs said threaded portion of said explosive bolt from said head and disconnects said second one-half of said shroud lines from said suspension plate thereby causing a collapse of said parachute.

2. A device for collapsing during descent a parachute having a plurality of shroud lines attached to an illuminating flare container as set forth in claim 1 wherein said threaded portion of said explosive bolt has a hole through the diameter thereof and wherein said second suspension cable is passed through said hole.

3. A device for collapsing during descent a parachute having a plurality of shroud lines attached to an illuminating flare container as set forth in claim 1 wherein said threaded portion of said explosive bolt is provided with an undercut to facilitate fracture of said bolt upon detonation of said heat sensitive detonator.

References Cited
UNITED STATES PATENTS

| | | | |
|---|---|---|---|
| 1,943,292 | 1/1934 | Babbitt | 102—35 |
| 3,055,300 | 9/1962 | Stoehr | 102—35.4 |
| 3,221,656 | 12/1965 | Sutten | 102—37.1 |

MILTON BUCHLER, Primary Examiner

J. E. PITTENGER, Assistant Examiner

U.S. Cl. X.R.

102—35, 37.1